Sept. 20, 1971 G. R. EAKIN ET AL 3,605,475
METHOD AND APPARATUS FOR EXTRUDING GEAR BLANKS
Filed June 19, 1969 2 Sheets-Sheet 1

INVENTORS
GERALD R. EAKIN,
& GEORGE T. PAYNE
BY
McNENNY, FARRINGTON,
PEARNE & GORDON
ATTORNEYS

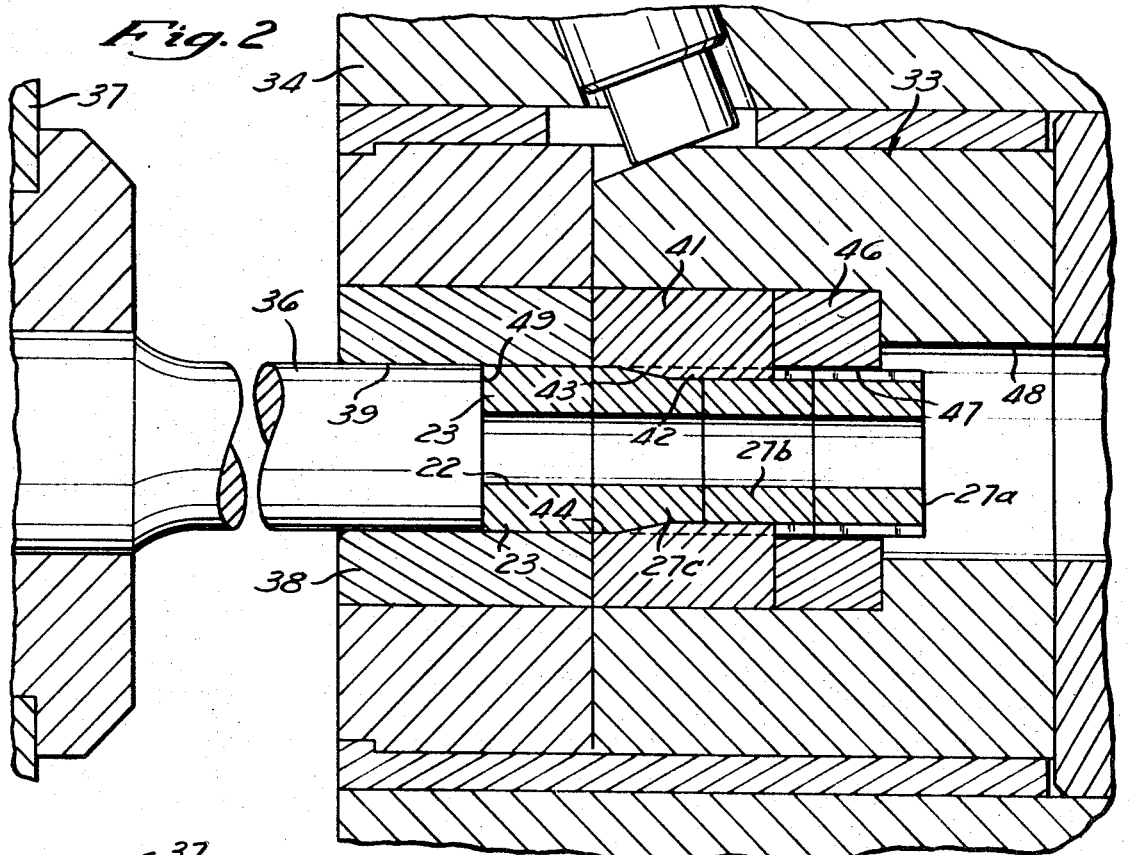
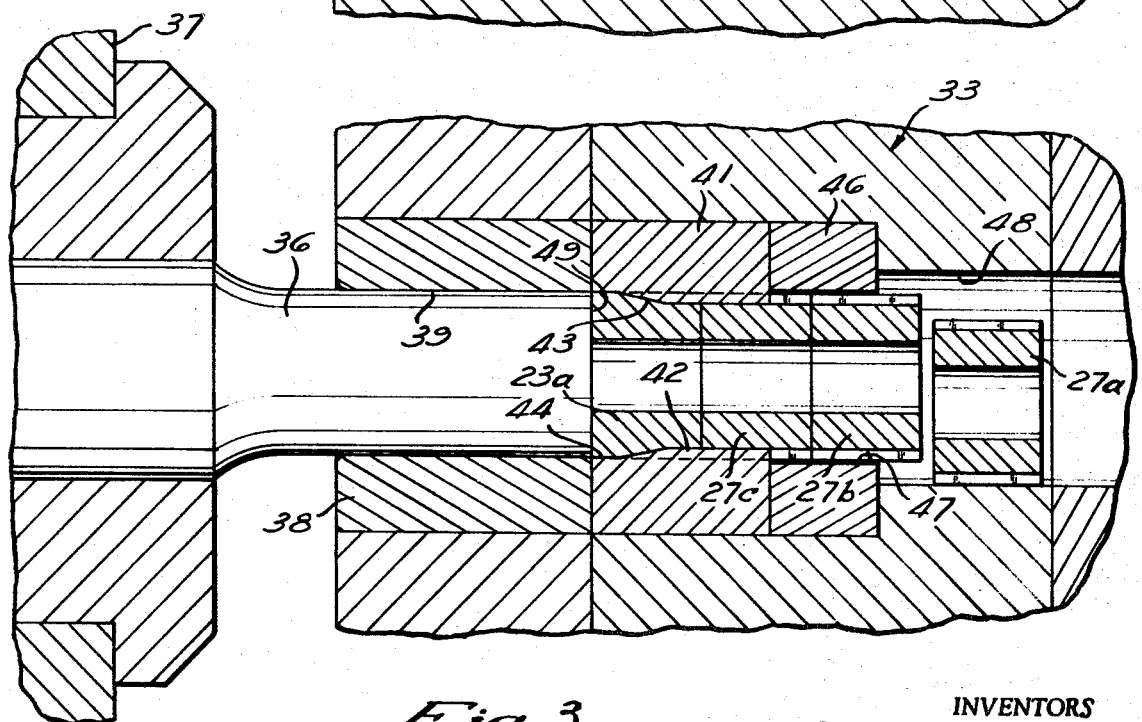

United States Patent Office 3,605,475
Patented Sept. 20, 1971

3,605,475
METHOD AND APPARATUS FOR EXTRUDING GEAR BLANKS
Gerald R. Eakin and George T. Payne, Tiffin, Ohio, assignors to The National Machinery Company, Tiffin, Ohio
Filed June 19, 1969, Ser. No. 834,672
Int. Cl. B21c 23/14, 25/02
U.S. Cl. 72—256
18 Claims

ABSTRACT OF THE DISCLOSURE

A forged blank for forming helical gears is disclosed. The blank is provided with shallow helical timing grooves formed by pressing the blank through an extrusion die having inwardly projecting helical teeth. The material displaced to form the groove flows inwardly toward an axial passage through the blank. The apparatus for forming the blank includes a non-rotating punch formed with a planar end face and a die assembly including a portion formed with inwardly extending helical teeth. The blank rotates around its axis and relative to the punch as it moves through the extrusion die. The punch does not enter the toothed portion of the die and a subsequent blank is utilized to press the preceding blank through the die. The blank is radially confined before extrusion loads are applied thereto and the end face of the blank is fully supported by the punch or a subsequent blank.

BACKGROUND OF INVENTION

This invention relates generally to the manufacture of gears and the like and more particularly, to a novel and improved forged gear blank for helical gears and the like, and to a novel and improved method and apparatus for manufacturing such blanks.

PRIOR ART

In the past it has generally been the practice to use hobbing and shaving processes or the like for the manufacture of helical gears, such as the helical gears utilized in automotive transmissions. Such manufacturing procedures result in a substantial amount of scrap, and machines for performing such operations have limited rates of production. In order to improve production rates, improve gear quality and to reduce scrap, such gears are sometimes formed by cold rolling.

Usually, in such cold rolling of gears, a blank is cold rolled between a pair of rotating tools having peripheral teeth shaped to form the required teeth on the gear. Such blanks are normally provided with a number of helical timing grooves, in their peripheries, equal to the number of teeth on the finished gear. These timing grooves insure proper timing of the tools and reduce the amount of flow of material required to form the gear, since the grooves are located in the positions ultimately occupied by the spaces between the gear teeth.

SUMMARY OF INVENTION

The present invention is directed to an improved gear blank which is suitable for cold roll-forming to the final gear shape and a method and apparatus for forming such blank. In accordance with one embodiment of this invention, wire or rod stock is cut into plugs and is progressively formed in a progressive cold former to a tubular shape. The slug is then pressed through an extrusion die having inwardly extending helical projections or teeth so that the final blank is a tubular member having helical timing notches or grooves in its periphery. Such gear blanks are manufactured with substantially no waste and have improved strength resulting from the cold working of the material forming the blanks. Also, the grain structure of the blank material at the blank surface tends to follow the blank surface since the timing grooves are not formed by removing material.

The gear formed from a blank, in accordance with this invention, is then finished by roll-forming the finished teeth and is normally faced at its ends to complete the manufacture of the gear. The blank is manufactured with substantially no scrap, with improved physical characteristics, and at very high production rates which are possible on automatic progressive cold formers and the like.

DESCRIPTION OF THE DRAWINGS

FIG. 2 is a fragmentary side elevation in longitudinal section of the tools and dies for extruding helical timing grooves on a blank, illustrating the punch in an intermediate position;

FIG. 3 is a longitudinal section similar to FIG. 2 illustrating the punch in its forwardmost position;

FIGS. 1a through 1f illustrate the progressive forming operations which may be used to form a blank in accordance with this invention. It should be understood that other procedures may be utilized to produce the slug which is subsequently pressed through the extrusion die to form the indexing grooves of the finished blank. Normally, the operations of FIGS. 1a through 1f are performed on a single progressive cold former which is adapted to automatically shear slugs 10 from rod or wire stock and automatically transfer such slugs to a plurality of working stations in which the slugs are progressively formed to the final shape.

Figures 1A, 1B, 1C, 1D, 1E, 1F:
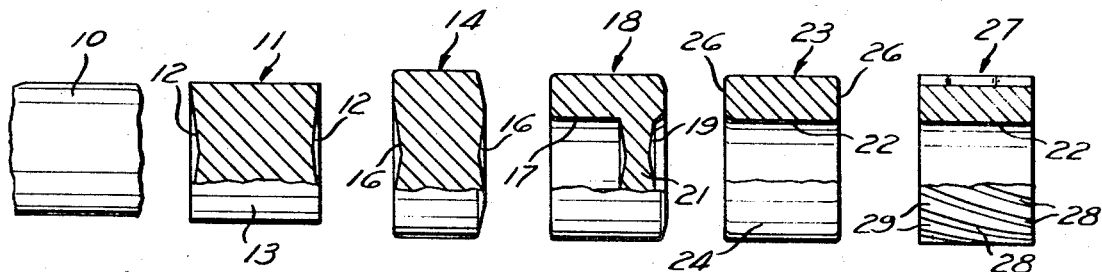
FIGS. 1a through 1f are views illustrating the progressive forming of the blank.

In the first forming operation, the slug is squared and upset to a slightly larger diameter. This eliminates the rough ends formed during shearing of the slug. At the completion of the first forming operation a first intermediate slug 11 is formed as illustrated in FIG. 1b. The first intermediate slug 11 has smooth, slightly concave end faces 12 and a smooth cylindrical outer surface 13 extending to relatively sharp corners at the ends.

The first intermediate slug 11 is then worked at the next die station to the shape of the second intermediate slug 14 illustrated in FIG. 1c. In the second station, the slug is upset to increase its diameter to substantially the full diameter of the finished blank. During this upsetting, the slug is axially shortened. The slug 14 is provided with relatively smooth end faces 16 which are slightly concave.

The slug 14 is subsequently formed in a third die station wherein punches are pressed into the blank from each end to form a blind passage 17 extending substantially half way through the intermediate blank 18 from one end and a relatively shallow recess 19 at its other end. The recess 19 and the passage 17 are separated by a relatively thin web 21. During the third operation the blank is extruded to increase its axial length to the length of the finished blank.

The blank 18 is then transferred to a subsequent die station wherein the web 21 is punched out to produce a through passage 22 of circular cross section. This last intermediate blank 23 has a smooth outer surface 24 and substantially square end faces 26. The diameter of the blank 23 is substantially equal to the final diameter of the finished blank and is substantially equal to the diameter of the finished blank and is substantially equal to the diameter of the intermediate blanks 14 and 18.

The blank 23 is then transferred to the final working station where it is pressed through an extrusion die to form the final blank 27. The blank 27 is provided with stub teeth 29 separated by shallow helical timing grooves 28 peripherally spaced around the blank. The grooves 28 have the same helix angle as the final gear teeth to be formed from the blank. Also, the blank has a number of grooves 28 and stub teeth 29 which is equal to the number of teeth required in the final blank.

Figures 6, 7:
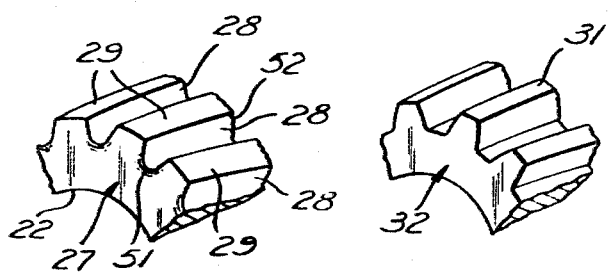
FIG. 6 is a fragmentary perspective view of the finished blank illustrating the shape of the teeth formed by the extrusion die.
FIG. 7 is a fragmentary perspective view of the finished gear which is roll-formed from the blank manufactured in accordance with this invention.

The gear tooth form, such as the shape illustrated in FIG. 7, is subsequently formed on a gear rolling machine. In the gear rolling operation, the stub teeth 29 extend in heighth and the grooves 28 are reshaped and increased in depth so that the final gear tooth 31 of the gear 32; is accurately formed. Usually after the rolling operation, the final gear is end faced to eliminate any distortion existing at the ends of the teeth and to properly shape the end face of the gear.

Figure 4:
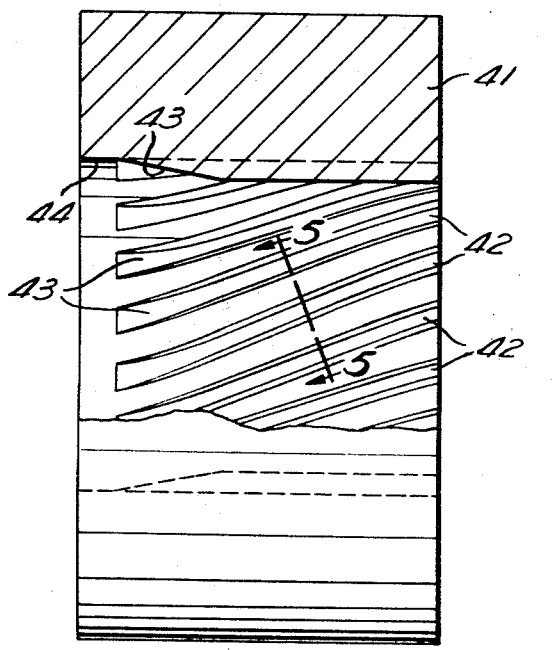
FIG. 4 is an enlarged view partially in section illustrating the structure of an extrusion die.
Figure 5:
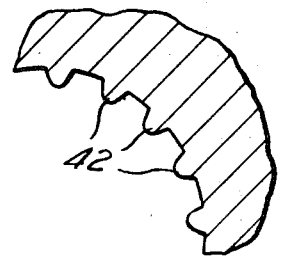
FIG. 5 is a fragmentary section taken generally along 5—5 of FIG. 3 illustrating the form of the teeth in the extrusion die.

Referring to FIGS. 2 and 3, the tools and dies at the last die station in which the helical extrusion is performed include an extrusion die assembly 33 mounted in the die breast 34 of the cold forging machine. A punch 36, carried by the header slide 37, operates to press the blanks through the extrusion die. The extrusion die assembly includes a tubular die element 38 having a through bore 39 with a diameter proportioned to closely fit the blank 23. Inwardly of the tubular die element 38 is the extrusion die 41 formed with peripherally spaced helical projections or teeth 42. The shape of the teeth 42 is best illustrated in FIGS. 4 and 5. The teeth 42 are curved at their inner extremities and have a cross section the same as the cross section of the grooves 28 of the final blank. Lead-in portions 43 at the forward end of the teeth blend inwardly from the main wall 44 to the full depth of the teeth 42 and provide a smooth transition section. The main wall portion 44 is of uniform diameter and is of a diameter slightly larger than the diameter of the blank 23 to provide clearance.

Rearwardly of the extrusion die 41 the die assembly 33 is provided with a tubular back-up ring 46 having a through bore 47 with a diameter slightly larger than the diameter of the blank to provide full clearance. The back-up ring 46 provides close support for the extrusion die to absorb the extrusion loads on the die. Rearwardly of the ring 46 the support elements are provided with a passage 48 leading out of the machine. This passage provides substantial clearance for the blanks.

The punch 36 is formed with a diameter proportioned to closely fit the bore 39 in the forward die element 38 and with a flat end face 49 perpendicular to the axis of the die. FIGS. 2 and 3 illustrate a condition after the machine is in operation. In FIG. 2, the innermost blank 27a has passed through the extrusion die 41 and is located in the bore 47. Immediately forward of the blank 27a is a blank 27b which still extends into the extrusion die. Forwardly of the blank 27b is a partially formed blank 27c which has been pushed by the tool 36 to the illustrated position in a prior cycle of operation. A blank 23 has been pushed by the punch 36 to a position immediately ahead of the extrusion die 41.

As the punch 36 moves to the right as viewed in FIGS. 2 and 3 to its forwardmost position illustrated in FIG. 3, the blank 23 is pressed into the extrusion die 41 until it reaches a position 23a formerly occupied by the blank 27c. During this portion of movement, the blank 23 is partially formed and the preceding blank 27c is moved to the position formerly occupied by the blank 27b. Similarly, the blank at the location 27d is pushed out of the back-up ring 46 into the passage 48. After the punch reaches its forwardmost position, as illustrated in FIG. 3, it is withdrawn by the header slide 37 and a subsequent blank 23 is positioned in front of the die element 38. On the subsequent stroke, such blank is pushed into the die assembly. The punch never enters the tooth zone of the extrusion die. With this arrangement, the punch does not have to turn and can be formed with a flat end face extending all the way to a position adjacent to the wall of the die opening 39. The punch end face 49 supports the entire end face of the blank 23 and the end faces of the blanks in turn support the adjacent end faces of the preceding blank.

The blanks moving through the extrusion die are rotated about their central axis by the helical teeth 42. The punch 36, however, is not rotated and relative rotation occurs between the end face 49 of the punch and the adjacent face of the blanks at least during the latter part of the forward movement when the blank actually engaged by the punch is moving into the helical tooth portion of the die. During the initial portion of the movement, however, relative rotation can occur between the blank 23 and the blank in the position 27c.

Since the end faces of the blanks are supported to the maximum extent, the tendency of the material of the teeth to be moved axially of the blank during the extrusion operation is minimized. However, some slight amount of dishing can occur at 51 (see FIG. 6) at the foreward end of the blank adjacent to the end of the grooves 28. Similarly, a slight amount of trailing can occur at 52 at the rearward end of the grooves. This does not present a probblem, however, since this axial displacement of material is minimized by the full support provided by the subsequent blank along the entire end face of the blank and since a facing operation is normally provided after the tooth is rolled to its final shape.

Preferably, the blanks are formed with a through bore 22 before they are extruded to form the tooth and indexing groove structure. The through bore provides an unrestrained surface so that material displaced to form the grooves 29 can flow inwardly toward the bore 22. A finishing operation may be used to provide the exact bore dimension required for the finished gear. The main surface 44 of the die is proportioned to closely fit the blank 23 and is provided only with sufficient clearance to prevent excessive friction and wear of the tooling. Since the lateral loading on the blank is symmetrical and balanced, excessive friction is not developed along the blank periphery. Also since the displacement of metal is inwardly toward the bore, large radial clearance is not necessary.

In the illustrated embodiment, the timing notches or grooves are shallow when compared to the spaces between the teeth of the finished gear. Therefore, the roll forming of the blank to finish the teeth requires substantial displacement of blank material. In some instances it is desirable to shape the projections on the extrusion die so they have a shape which closely approximates the spaces between the teeth in the finished gear. When this is done, the amount of working required to finish the teeth is reduced. However, the pressure on the projections of the extrusion die tends to be higher and the rate of die wear tends to be greater.

In other instances, particularly when the gear is formed of softer material, a method and apparatus in accordance with this invention can be used to finish form the teeth of the gear solely by extrusion. In such instances the projections on the extrusion die are proportioned to mate with the spaces between the teeth so that the blank emerging from the extrusion die is provided with fully formed teeth of the required shape.

It should be understood that blanks formed in accordance with this invention can also be finished by methods other than form rolling, for example the blanks may be finished by gear grinding or shaving processes.

When the gear form required is such that the forward end of one blank does not mate and provide full support for the rearward end of another blank, the extrusion can be performed by pushing each blank into the extrusion die with a tool formed with a mating end face and then ejecting the blank back out of the die. In such a method the tool is shaped to support the adjacent end of the blank but the helical grooves do not extend all the way to the rearward face of the blank since the tool does not enter the zone of actual extrusion. Blanks of this type can be finished by subsequent removal of the portion of the blank which does not have the helical grooves therein.

Although a preferred embodiment of this invention is disclosed it to be understood that various modifications and rearrangements may be resorted to without departing from the scope of the invention disclosed.

What is claimed is:

1. A method of forming a gear blank with longitudinally extending helical grooves on its outer periphery comprising forming a cylindrical slug with an outer diameter substantially equal to the final outer diameter of said blank, pressing said slug into an extrusion die having radial, inwardly extending longitudinal helical projections while allowing said slug to turn about its axis as it passes along said helical projections, and using a subsequent slug to complete the movement of said slug through said die.

2. A method of forming a gear blank with longitudinally extending helical grooves on its outer periphery comprising forming a cylindrical slug with an outer diameter substantially equal to the final outer diameter of said blank and with an axially extending opening at least part way therethrough, and pressing said slug into an extrusion die having radial, inwardly extending longitudinal helical projections while allowing said slug to turn about its axis as it passes along said helical projections to thereby cause material displaced by said projections to flow radially toward said opening.

3. A method of forming blanks as set forth in claim 1 wherein the slugs are formed so that the rearward end face of one slug mates with the adjacent forward end face of the subsequent slug.

4. A method of forming blanks as set forth in claim 3 wherein a tool having an end face proportioned to mate with substantially the entire rearward end face of said slugs is used to press said slugs through said extrusion die.

5. A method of forming blanks as set forth in claim 4 wherein said end face of said tool is held against rotation.

6. A method of forming blanks as set forth in claim 5 wherein the end faces of said slugs and the end face of said tool are flat faces contained in planes perpendicular to the axis of said slugs.

7. A method of forming blanks as set forth in claim 1 wherein said projections are symmetrically positioned around said extrusion die.

8. A method of forming banks as set forth in claim 1 wherein said slug is radially confined before it enters said extrusion die.

9. A method of forming blanks as set forth in claim 8 wherein the portions of said extrusion die between said projections are formed with a diameter at least as great as the diameter of said slug.

10. A method of forming blanks as set forth in claim 2 wherein said slug is formed so that said opening extends completely through said blank.

11. A method of forming blanks as set forth in claim 1 wherein said slug is pushed through said extrusion die by a non-rotating tool and said slug rotates with respect to the tool during at least a portion of its movement by said tool.

12. A method of forming blanks as set forth in claim 1 wherein said slug is radially confined by a cylindrical entrance passage in said extrusion die, having a length at least as long as the length of said slug.

13. An apparatus for forming helical grooves in a cylindrical blank for helical gears comprising a die assembly formed with an entrance passage proportioned to closely fit said blank and radially confine said blank, an extrusion portion formed with a plurality of helical projections extending inwardly from a wall portion having a diameter substantially equal to that of the blank and proportioned to form said grooves, and a tool movable into said passage for pressing blanks into said extrusion portion, said tool being formed with an end face shaped to mate with substantially all of one end face of said blank, said tool being mounted for reciprocation in said passage such that the inward movement of said tool terminates at a forwardmost position before said tool end face enters said extrusion portion and said tool withdraws from said forwardmost position to permit a subsequent blank to be introduced into said passage and be caused to force said first mentioned blank through said extrusion portion.

14. An apparatus for forming helical grooves on a blank blank as set forth in claim 13 wherein said end face is symmetrical in respect to the axis of said extrusion die and is held against rotation about said axis.

15. An apparatus for forming helical grooves on a blank as set forth in claim 13 wherein sections of said wall between said projections are proportioned to receive said blank with a slight clearance.

16. An apparatus for forming helical grooves on a blank as set forth in claim 15 wherein said end face of said tool is contained with a plane substantially perpendicular to the axis of said extrusion die.

17. A blank for forming helical gears having helical timing grooves in the periphery thereof comprising a tubular body having an axial central passage therein and a plurality of symmetrically located similar helical, longitudinally extending grooves in the peripheral surface, the central passage extending axially into a portion of said body encircled by said grooves, said blank being formed of a material which work hardens, substantially all of the material adjacent to the surface of said grooves having a grain structure resulting from radially inward displacement of material by axial extrusion of said body.

18. A method of forming gear blanks having axially extending helical grooves on their outer peripheries comprising forming cylindrical slugs each with a central axial hole and an outer diameter substantially equal to the desired final outer diameter of the blank, providing a die assembly formed with an entrance passage proportioned to radially confine a slug with a close radial fit, an extrusion portion formed with an interior wall having a diameter approximately equal to the diameter of a slug, and a plurality of helical projections symmetrically arranged about said wall and extending radially inward from and helically along the wall, pressing a first slug forward through the extrusion die assembly with a tool operating against a second intermediate slug which presses substantially the entire rearward face of the first slug with its forward face to cause said projections to displace material of the first slug radially inward from areas occupied by the projections into the area originally enclosed by its central hole and causing said projections to convert the axial force developed by said tool into a rotational force sufficient to rotate the first slug about its axis relative to said tool along a path defined by said helical projections to thereby form grooves along the periphery of said first slug complementary to the configuration of said projections.

References Cited

UNITED STATES PATENTS

| | | | |
|---|---|---|---|
| 985,905 | 3/1911 | Johnston | 29—159.2 |
| 3,281,925 | 11/1966 | Hanna | 29—159.2 |
| 3,267,712 | 8/1966 | Atkin | 72—260 |
| 3,399,560 | 9/1968 | Connolly | 72—256 |
| 3,190,101 | 6/1965 | Caisley | 72—260X |
| 2,954,121 | 9/1960 | Benson | 72—260X |

FOREIGN PATENTS

| | | | |
|---|---|---|---|
| 504,694 | 12/1954 | Italy | 72—254 |

LOWELL A. LARSON, Primary Examiner

U.S. Cl. X.R.

29—159.2; 72—260

PO-1050
(5/69)

UNITED STATES PATENT OFFICE
CERTIFICATE OF CORRECTION

Patent No. 3,605,475      Dated September 20, 1971

Inventor(s) Gerald R. Eakin, George T. Payne

It is certified that error appears in the above-identified patent and that said Letters Patent are hereby corrected as shown below:

Column 2, line 2, "plugs" should be -- slugs -- .

Column 3, lines 24 and 25, cancel "and is substantially equal to the diameter of the finished blank" as it appears twice.

Column 3, line 37, cancel "ma-" at the end of the line.

Column 4, line 19, "27d" should be -- 27a -- .

Claim 14, line 34, cancel "blank" as it appears twice.

Signed and sealed this 7th day of March 1972.

(SEAL)
Attest:

EDWARD M. FLETCHER, JR.      ROBERT GOTTSCHALK
Attesting Officer      Commissioner of Patents